United States Patent [19]

Sonoda

[11] Patent Number: 4,723,597
[45] Date of Patent: Feb. 9, 1988

[54] HEAT EXCHANGER CORE

[75] Inventor: Noriaki Sonoda, Sagamihara, Japan

[73] Assignee: Nihon Radiator Co., Ltd., Tokyo, Japan

[21] Appl. No.: 765,385

[22] Filed: Aug. 13, 1985

[51] Int. Cl.$^4$ .......................... F28F 13/18; B23K 35/34
[52] U.S. Cl. ...................................... 165/133; 148/26; 228/183; 228/211; 228/223
[58] Field of Search ................ 165/133; 228/183, 207, 228/211, 223; 148/26; 75/257

[56] References Cited

U.S. PATENT DOCUMENTS

| | | | |
|---|---|---|---|
| 3,580,748 | 5/1971 | DeSony | 148/26 |
| 3,951,328 | 4/1976 | Wallace et al. | 228/223 X |
| 3,960,208 | 6/1976 | Anthony et al. | 165/133 X |
| 4,368,371 | 1/1983 | Dilthey et al. | 148/26 X |
| 4,556,165 | 12/1985 | Yamawaki et al. | 228/223 |

FOREIGN PATENT DOCUMENTS

| | | | |
|---|---|---|---|
| 2391803 | 1/1979 | France | 228/207 |
| 110894 | 9/1981 | Japan | 165/133 |
| 137096 | 10/1981 | Japan | 165/133 |
| 142493 | 9/1982 | Japan | 165/133 |
| 171580 | 10/1983 | Japan | 228/223 |
| 179798 | 10/1983 | Japan | 165/133 |

*Primary Examiner*—Albert W. Davis, Jr.
*Assistant Examiner*—Peggy Neils
*Attorney, Agent, or Firm*—Gordon W. Hueschen

[57] ABSTRACT

A heat exchanger core having a tube of aluminum material and heat transfer fins of aluminum material joined to each other with a brazing filler, which has at least part of the surface thereof coated with an inorganic sintered layer incorporating therein a pigment-containing phase of the two complexes of potassium hexafluoroaluminate and potassium tetrafluoroaluminate.

19 Claims, 2 Drawing Figures

HEAT EXCHANGER CORE

BACKGROUND OF THE INVENTION

1. Field of the Invention:

This invention relates to a heat exchanger core and a method for the production thereof. More particularly, this invention relates to a heat exchanger core having a core part thereof brazed by the use of a flux of potassium fluoroaluminate complex, which heat exchanger core is made of an aluminum material and therefore is enabled to obviate the necessity for application of a coating subsequent to the brazing and to a method for the production thereof.

2. Description of the Prior Art:

In recent years, the heat exchangers such as radiators for automobiles and condensers for car coolers use an aluminum material (aluminum or aluminum alloy) in their core parts for the purpose of reduction in weight.

In the heat exchanger made of an aluminum material, used as a condenser in a car cooler, for example, the core part thereof is produced by molding its heat transfer fins with an aluminum material clad with a brazing filler and its tube with an aluminum material, fitting the components to each other with the aid of a jig, for example, and brazing them. As is widely known, in the brazing of parts of an aluminum material, an aluminum oxide coating of a high melting point formed on the surface of the aluminum material is required to be removed from the positions destined to undergo brazing. Unless the brazing is carried out under special conditions in a vacuum or in an atmosphere of inert gas (inevitably by the use of an expensive apparatus), there is followed a practice of applying a flux for the removal of aluminum oxide at least on the positions expected to undergo brazing in advance of the brazing. The flux heretofore used for this purpose has been a mixture of inorganic chlorides (such as for example, alkali metal chlorides and alkaline earth metal compounds). Since such water-soluble compounds by nature are liable to corrode aluminum in the presence of water, however, the core part of the heat exchanger assembled by brazing has inevitably to be subjected to a cleaning work for the removal of water-soluble flux subsequently to the brazing.

Recently, to take the place of the conventional flux of inorganic chlorides, NOCOROC flux (Registered trademark of Alcan Research and Development Limited.) (potassium fluoroaluminate complex) has been proposed and adopted for actual use. This NOCOROC flux possesses a characteristic property of remaining non-hygroscopic prior to brazing and becoming substantially water-insoluble subsequently to brazing and, at the same time, another characteristic property of assuming, while in a fused state, reactivity at a temperature below the melting point of the brazing filler and consequently functioning as a flux for aluminum oxide and remaining unreactive to aluminum (Japanese Patent Publication SHO No. 58(1983)-27,037). When the brazing is effected by the use of NOCOROC flux, therefore, the phenomenon of the corrosion of aluminum by the residual flux experienced by the conventional flux of inorganic chlorides is substantially eliminated.

Even when the heat exchanger undergoes the brazing by the use of this NOCOROC flux, the practice of applying a coating thereon after the brazing work is still persisting. In this case, however, the NOCOROC flux exhibits no corrosiveness to the aluminum material as already described. In fact, in the bench test conducted by me, the heat exchanger assembled by brazing by the use of the NOCOROC flux has shown substantially no discernible difference in corrosion-proofness between the presence and absence of the coating. It has thus been ascertained to me that the necessity for applying the coating arises rather from the standpoint of mainly repressing the haze due to the gloss of the aluminum material and enhancing the commercial value of the heat exchanger as a whole than from the standpoint of improving the corrosion-proofness of the heat exchanger.

In view of the true state of affairs described above, I have concluded it extremely uneconomical to apply a coating on the heat exchanger solely for the purpose of repressing glaring and enhancing commercial value and have made efforts to develop a heat exchanger enabled to obviate the necessity for the step of coating which is so uneconomical as described above and greatly elongates the time required for the production of the heat exchanger.

An object of this invention, therefore, is to provide a heat exchanger core excellent in glare-proofness and a method for the production thereof.

Another object of this invention is to provide a heat exchanger core assembled by brazing by the use of NOCOROC flux, which heat exchanger core possesses sufficiently high glare-proofness without requiring a coating to be applied on the surface portions thereof, and a method for the production thereof.

Yet another object of this invention is to provide a heat exchanger core which does not require application of a coating and which, therefore, is less expensive and permits a cut in the time required for production.

SUMMARY OF THE INVENTION

The objects described above are accomplished by a heat exchanger core obtained by molding a tube of an aluminum material and heat transfer fins of an aluminum material and joining them by brazing, which has at least part of the surface thereof coated with an inorganic, sintered layer incorporating therein a pigment-containing phase of two complexes, potassium hexafluoroaluminate ($K_3AlF_6$) and potassium tetrafluoroaluminate $KAlF_4$).

Further, these objects are fulfilled by a method for the production of a heat exchanger core, which comprises molding a tube of an aluminum material and heat transfer fins of an aluminum material, at least either the tube or the heat transfer fins to each other, applying a flux formed of pigment-containing complexes of potassium hexafluoroaluminate and potassium tetrafluoroaluminate on the surface of the tube and that of the heat transfer fins, and subsequently heating the flux thereby sintering the flux.

This invention has a salient characteristic that the repression of the glaring of the heat exchanger core due to the gloss of the aluminum material an the enhancement of the commercial value of the heat exchanger core heretofore attained by the application of a coating are now fulfilled by causing a pigment to be contained in the inorganic, sintered layer, incorporating therein a phase of two complexes of potassium hexafluoroaluminate and potassium tetrafluoroaluminate thereby enabling the sintered layer to assume a color. To be more specific, the present invention has originated in the cognizance of the fact that when the particular flux (NOCOROC flux) composed of a mixture of potassium hexafluoroaluminate and potassium tetrafluoroaluminate is used in the brazing work, a water-insoluble rigid inorganic, sintered layer incorporating therein a phase of the two complexes of potassium hexafluoroaluminate and potassium tetrafluoroaluminate is produced by sintering on the surface of the aluminum material coated with the NOCOROC flux at the time the assembled heat exchanger core undergoes the brazing work and has culminated in the concept of forming a colored, inorganic, sintered layer possessed of a glare-proofing effect by adding a pigment to be contained in the inorganic, sintered layer which is deposited rapidly by sintering on the surface of the aluminum material. Thus, the present invention enables the repression of the glaring of the heat exchanger core and the enhancement of the commercial value of the heat exchanger core to reach desired levels without requiring application of a coating subsequently to the brazing work and realized provision of a heat exchanger core inexpensively with an appreciable cut in the time for the production.

DESCRIPTION OF PREFERRED EMBODIMENT

The expression "heat exchanger core" as used in this invention embraces the cores of radiators for automobiles, those of evaporators for car coolers, those of condensers for coolers, those of car heaters, etc., which each comprise a tube and heat transfer fins and, in the cores of radiators and car heaters, further comprise a seat plate, a reinforcement, etc. All these components are formed of aluminum material.

Figure 1:
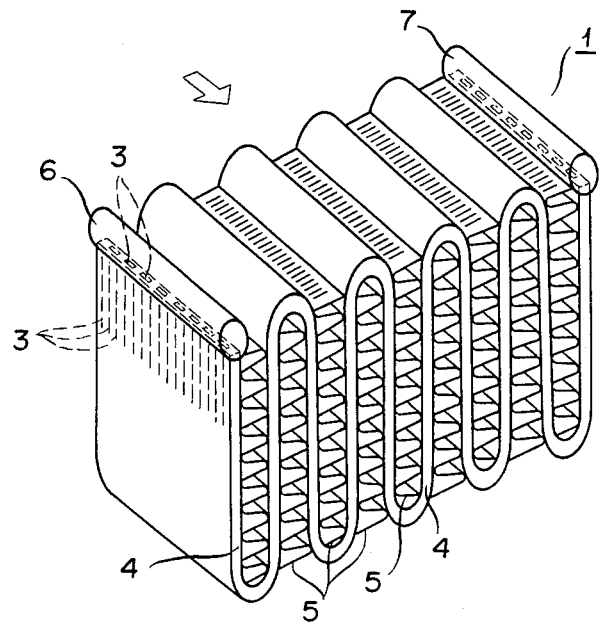
FIG. 1 is a perspective view illustrating a typical heat exchanger core according to the present invention.

For Example, the serpentine type heat exchanger has an appearance as illustrated in FIG. 1. This evaporator 1 is constructed by zigzagging a flattened tube 4 incorporating therein a multiplicity of holes 3 for passing coolant and nipping corrugated fins 5 between the adjacent webs of the zigzagged tube 4. The coolant which enters the evaporator 1 through an inlet side conduit 6, flows through the interior of the tube 4, and departs from the evaporator 1 through an outlet side conduit 7, therefore, exchanges heat with the air flowing along the fins 5. All the components of the evaporator are formed of aluminum material.

For the passage of heat medium in the heat exchanger of this invention, there can be used a multiplicity of straight tubes circular, elliptic or rectangular in cross section, a zigzagged (serpentine) flat tube containing a multiplicity of parallely spaced continuous holes for passage of heat medium, or a tube-forming member composed of a multiplicity of tube units each produced by joining two tray-shaped plates (pieces) around their flange parts in the manner of a cream puff so as to give rise therein to a passage for heat medium.

The aluminum material to be used in the present invention is not limited in any respect. Aluminum alloys of grades 1050, 1100, 3003, 3004, 3005, 3200, 5005, and 6951, for example, are available as the aluminum material. The brazing filler is an aluminum material which has a lower melting point than the aluminum material of which the tube and the fins are made. Generally, this aluminum material is an alloy of aluminum with 4.5 to 13.5% by weight of Si. The alloys which answer this description include such aluminum materials as 4034 (containing 4.5 to 6.0% by weight of Si), 4045 (containing 9.0 to 11.0% by weight of Si), 4343 (containing 6.8 to 8.2% by weight of Si), and 4047 (containing 11.0 to 13.0% b weight of Si). With consideration to the ease of the work to be involved, the brazing filler is clad on the aluminum material of at least either of the components to be joined.

The NOCOROC flux to be used in the present invention is a mixture of potassium tetrafluoroaluminate ($KAlF_4$) and potassium hexafluoroaluminate ($K_3AlF_6$) which are complexes of potassium fluoride (KF) with aluminum fluoride ($AlF_3$). Generally, it is used in the form of an aqueous slurry. When it is used as an aqueous slurry, the mixing ratio of the mixture of potassium fluoroaluminate complexes and water is in the range of about 2:100 to about 20:100. This aqueous slurry is obtained by melting $AlF_3$ and KF simultaneously in an exact ratio, cooling the resultant mixture, comminuting the cooled mixture into particles of a suitable diameter, generally below 100 mesh, desirably below 150 mesh, and more desirably below 200 mesh, and mixing the comminuted substance with water in a prescribed ratio thereby suspending the substance in water and giving rise to a dilute aqueous slurry. Otherwise, potassium tetrafluoroaluminate and potassium hexafluoroaluminate may be prepared independently of each other and mixed at a prescribed ratio. A method for the preparation of potassium tetrafluoroaluminate is described in Broset: "Z. Anorg. Algem. Chemie", 239, 301–304 (1938).

A typical method adopted for the production of NOCOROC flux comprises adding two parts by weight of water to one part by weight of the communited mixture thereby producing a dilute slurry and adding a small amount of surfactant during the preparation of the slurry. The relative proportions of KF and $AlF_3$ used in the preparation of NOCOROC flux are desired to approach the ratio of the azeotrope as much as possible. The NOCOROC flux, therefore, substantially comprises a mixture of $K_3AlF_6$ and $KAlF_4$ of respective amounts to satisfy a KF/$AlF_3$ ratio (by weight) of 40:50 to 50:50. It contains substantially no unaltered KF.

To the NOCOROC flux so produced is added a pigment. This pigment can be any of the known pigments which refrains from obstructing the removal of the aluminum oxide coating by the flux. Examples of the pigment meeting this condition include various inorganic pigments such as carbon black, white carbon, titanium white, and satin white and other pigments. When carbon is adopted as the pigment, the amount of the carbon to be added is in the range of 3 to 50% by weight, preferably 3 to 20% by weight, based on the mixture of $K_3AlF_6$ and $KAlF_4$ contained in the slurry. If the amount of the carbon is less than 3% by weight, the inorganic, sintered layer formed on the surface of aluminum assume color not sufficient for repressing the haze of the heat exchanger core. If this amount exceeds 50% by weight, there is the possibility that the amount of carbon is too much for the brazing to be carried out perfectly.

Figure 2:
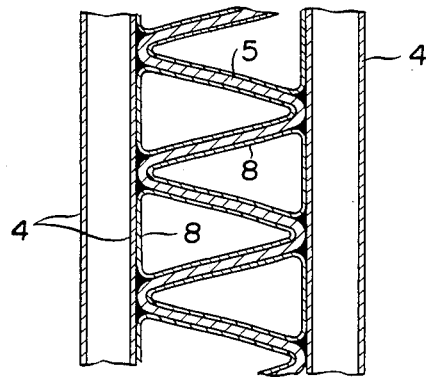
FIG. 2 is a magnified view of the essential part of the heat exchanger core of FIG. 1.

In the case of the condenser for a car cooler, for example, showing in FIGS. 1 and 2, heat transfer fins 5 such as corrugated fins are molded of a clad material prepared by having the aluminum material clad on both surfaces thereof with brazing filler and a tube 4 is molded of the aluminum material, the components are fitted to each other in a prescribed pattern optionally with the aid of a jig, and the flux containing the pigment is applied by spraying or some other suitable method on the surface of the assembled condenser in a ratio of 1 to 10 g/m², preferably 2 to 5 g/m². In this case, the flux is not always required to be applied on the entire surface but is only required to be applied at least on the positions destined to undergo brazing and other positions necessary for the formation of an inorganic, sintered layer sufficient to acquire required glare-proofness. The assembled condenser coated with the flux is then placed in an oven and subjected to brazing at a temperature of about 580° to 620° C. for 0.5 to 5 minutes. In this case, the atmosphere in which the brazing is carried out is desired to be of a non-oxidative gas such as nitrogen, carbon dioxide, or helium.

The heat exchanger core of this invention can be produced as described above. Where the flux remains on the surface, there is formed an inorganic, sintered layer 8 having a thickness of about 1 to 10 μm and colored with the pigment. This sintered layer is attached fairly strongly to the surface of the aluminum material and it is rigid and insoluble in water. Thus, it will not easily peel off the surface of the aluminum material.

The heat exchanger core of the present invention has the core part thereof formed by molding a tube of aluminum material and heat transfer fins of aluminum material and joining the two components to each other through the medium of brazing filler. It is, therefore, characterized by having at least part of the surface of the core coated with the inorganic, sintered layer having incorporated therein a pigment-containing phase of the two complexes of potassium hexafluoroaluminate and potassium tetrafluoroaluminate. It possesses sufficient glare-proofness to obviate the necessity for undergoing a surface treatment with a coating material. When the inorganic sintered layer is colored with the pigment, then the produced heat exchanger core enjoys sufficiently high commercial value in terms of appearance. This pigment-containing inorganic, sintered layer can be produced simply by using the NOCOROC flux having the pigment added thereto in advance and processing the assembled heat exchanger core by any of the known methods. The production of the heat exchanger core by this method obviates the need for any application of a coating. The heat exchanger core, therefore, can be produced less expensively and more quickly than the conventional heat exchanger core.

What is claimed is:

1. A heat exchanger core having a tube of aluminum material and heat transfer fins of aluminum material joined to each other with a brazing which has at least part of the surface thereof coated with an inorganic, non-metallic, sintered layer having incorporated therein a pigment-containing phase of the two complexes of potassium hexafluoroaluminate and potassium tetrafluoroaluminate, said sintered layer being characterized by sufficient glare-proofness to obviate the necessity for surface treatment with coating material.

2. A heat exchanger core according to claim 1, wherein said inorganic, sintered layer has a thickness in the range of about 1 to about 10 μm.

3. A heat exchanger core according to claim 2, wherein said pigment is contained in an amount of 3 to 50% by weight based on said complexes.

4. A heat exchanger core according to claim 3, wherein said pigment is an inorganic pigment.

5. A method for the production of a heat exchanger core, which comprises preparing a tube of aluminum material and heat transfer fins of aluminum material, at least either of said tube and said transfer fins being coated with a brazing filler, fitting said tube and said heat transfer fins to each other, applying a pigment-containing flux formed of the complexes of potassium hexafluoroaluminate and potassium tetrafluoroaluminate and a pigment on the surface of said tube and that of said heat transfer fins, and subsequently heating to effect brazing and to sinter said flux, thereby providing a surface characterized by sufficient glare-proofness to obviate the necesity for surface treatment with coating material.

6. A method according to claim 5, wherein said pigment is contained in an amount of 3 to 50% by weight based on said complexes.

7. A method according to claim 6, wherein said flux is applied at a rate of 1 to 10 g/m².

8. A method according to claim 6, wherein said pigment is an inorganic pigment.

9. A method according to claim 5, wherein said heating is carried out at a temperature in the range of about 580° to about 620° C. for 0.5 to 5 minutes.

10. A heat exchanger core of claim 3 in which the pigment-containing phase is substantially free of KF and the KF/AlF₃ ratio by weight is between about 40:50 and 50:50.

11. A heat exchanger core of claim 10 in which the KF and the KF/AlF3 are substantially in azeotropic proportions.

12. A method according to claim 6 in which the pigment-containing phase is substantially free of KF and the KF/AlF₃ ratio by weight is between about 40:50 and 50:50.

13. A method according to claim 12 in which the KF and the KF/AlF₃ are substantially in azeotropic proportions.

14. A heat exchanger core of claim 4 in which the pigment is selected from carbon black, white carbon, titanium white, and satin white.

15. A method according to claim 8 in which the pigment is selected from carbon black, white carbon, titanium white, and satin white.

16. A heat exchanger core according to claim 1 wherein said inorganic, non-metallic sintered layer has a thickness in the range of about 1 to about 10 μm; wherein said pigment is contained in an amount of 3 to 50 percent by weight based on said complexes; in which the pigment is selected from carbon black, white carbon, titanium white, and satin white; and in which the pigment-containing phase is substantially free of KF and the KF/AlF₃ ratio by weight is between about 40:50 and 50:50.

17. A method according to claim 5 wherein said pigment is contained in an amount of 3 to 50 percent by weight based on said complexes; wherein said flux is applied at a rate of 1 to 10 g/m²; in which the pigment is selected from carbon black, white carbon, titanium white, and satin white; and in which the pigment-containing phase is substantially free of KF and the KF/AlF₃ ratio by weight is between about 40:50 and 50:50.

18. A heat exchanger core of claim 16 in which the KF and the KF/AlF₃ are substantially in azeotropic proportions.

19. A method according to claim 17 in which the KF and the KF/AlF₃ are substantially in azeotropic proportions.

* * * * *

UNITED STATES PATENT AND TRADEMARK OFFICE
CERTIFICATE OF CORRECTION

PATENT NO.   :   4,723,597
DATED        :   February 9, 1988
INVENTOR(S)  :   Noriaki Sonoda It is certified that error appears in the above-identified patent and that said Letters Patent is hereby corrected as shown below:

Title Page, the line below "[22] Filed: August 13, 1985";
  insert as a new item the following:
  --           [30] Foreign Application Priority Data
       August 15, 1984   [JP]   Japan .....   59-169,243 --

Title Page, [56] References Cited, U.S. PATENT DOCUMENTS, line 1;
  "DeSony" should read -- Delong --
Title Page, [56] References Cited, FOREIGN PATENT DOCUMENTS,
  line 1;   "1/1979" should read -- 1/1978 --
Col. 2, line 58; "an" should read -- and --
Col. 2, line 62; delete the comma "," after "layer"
Col. 4, line 4; "b" should read -- by --
Col. 4, line 33; "communited" should read -- comminuted --
Col. 6, line 11; "necesity" should read -- necessity --

Col. 6, line 28; "KF/AlF3" should read -- $KF/AlF_3$ --

Signed and Sealed this

Fourth Day of October, 1988

Attest:

DONALD J. QUIGG

Attesting Officer

Commissioner of Patents and Trademarks